(12) United States Patent
Sugarman

(10) Patent No.: US 9,716,655 B2
(45) Date of Patent: Jul. 25, 2017

(54) PROCESSING REQUESTS

(75) Inventor: Richard Sugarman, Enfield (GB)

(73) Assignee: METASWITCH NETWORKS LTD, Enfield (GB)

( * ) Notice: Subject to any disclaimer, the term of this patent is extended or adjusted under 35 U.S.C. 154(b) by 0 days.

(21) Appl. No.: 13/598,384

(22) Filed: Aug. 29, 2012

(65) Prior Publication Data

US 2013/0223431 A1    Aug. 29, 2013

(30) Foreign Application Priority Data

Aug. 30, 2011    (GB) .................................. 1114913.5

(51) Int. Cl.
| | | |
|---|---|---|
| *H04L 29/12* | (2006.01) | |
| *H04L 12/741* | (2013.01) | |
| *H04L 1/00* | (2006.01) | |
| *H04L 9/00* | (2006.01) | |
| *H04W 40/00* | (2009.01) | |
| *H04L 12/725* | (2013.01) | |
| *H04L 29/06* | (2006.01) | |

(52) U.S. Cl.
CPC ......... *H04L 45/745* (2013.01); *H04L 45/308* (2013.01); *H04L 65/1006* (2013.01); *H04L 65/1076* (2013.01); *H04W 40/00* (2013.01)

(58) Field of Classification Search
CPC ... H04L 45/54; H04L 63/126; H04L 65/1036; H04L 65/1076
See application file for complete search history.

(56) References Cited

U.S. PATENT DOCUMENTS

| | | | | |
|---|---|---|---|---|
| 5,805,569 | A * | 9/1998 | Lindqvist | H04L 47/10 370/229 |
| 2002/0080798 | A1* | 6/2002 | Hariguchi et al. | 370/395.31 |
| 2002/0136374 | A1* | 9/2002 | Fleischer et al. | 379/114.01 |
| 2003/0095555 | A1* | 5/2003 | McNamara | H04L 29/06 370/401 |
| 2004/0037297 | A1* | 2/2004 | Ishida | H04L 29/06 370/395.54 |
| 2006/0050712 | A1* | 3/2006 | Allen | 370/395.2 |
| 2007/0104106 | A1* | 5/2007 | Patel | H04L 45/02 370/238 |

(Continued)

FOREIGN PATENT DOCUMENTS

CN    101771686 A    7/2010

*Primary Examiner* — Parth Patel
*Assistant Examiner* — Jason Harley
(74) *Attorney, Agent, or Firm* — EIP US LLP

(57) ABSTRACT

Measures for processing requests in a telecommunications network are provided. A blacklist for determining routing attempts to be conducted during a default routing attempt procedure is maintained. A request comprising an identifier for a given destination for the request is received and, in response to performing a destination address lookup for the identifier, a set of one or more destination addresses for routing the request to is received. One or more destination addresses in the set are compared to the list of destinations on the blacklist. If the comparison indicates that at least one of the destination addresses in the set is not present on the blacklist, the request is processed according to a default routing attempt procedure. If the comparison indicates that all of the destination addresses in the set are present on the blacklist, the request is processed according to an alternative routing attempt procedure.

17 Claims, 8 Drawing Sheets

(56) References Cited

U.S. PATENT DOCUMENTS

| | | | |
|---|---|---|---|
| 2008/0220740 A1* | 9/2008 | Shatzkamer | H04L 63/101 |
| | | | 455/411 |
| 2010/0002686 A1* | 1/2010 | Rosenberg et al. | 370/352 |
| 2010/0027551 A1* | 2/2010 | Arkin | 370/400 |
| 2011/0149978 A1* | 6/2011 | Moser et al. | 370/400 |

* cited by examiner

FIG. 2                                                    PRIOR ART

PROCESSING REQUESTS

CROSS REFERENCE TO RELATED APPLICATION

This application claims priority to foreign Patent Application No. GB 1114913.5, filed on Aug. 30, 2011, the content of which is hereby incorporated by reference in its entirety.

TECHNICAL FIELD

The present disclosure relates to methods, apparatus and computer program products for processing requests in a telecommunications network.

BACKGROUND

In telecommunications networks, a user of an originating communication device may wish to conduct a communication session such as a Voice over Internet Protocol (VoIP) call with the user of another communication device. In order to set up such a communication session, a request, such as a Session Initiation Protocol (SIP) Invite request, will be transmitted from an originating communication device to a network device such as a SIP server which is responsible for routing the request to the appropriate destination.

A request will contain an identifier for a destination for the request, for example a hostname (such as 'metaswitch.com'). To work out where to send such requests, the SIP protocol stipulates (for example in Internet Engineering Task Force (IETF) Request for Comments (RFCs) 3261 and 3263) that one or more destination address lookups should be performed by the SIP element that is responsible for routing the request. A destination address lookup may for example comprise transmitting a Domain Name System (DNS) query to a DNS server responsible for providing a DNS lookup service in the telecommunications network. Such destination address lookups resolve a hostname or other identifier to a set of destination addresses to try.

Assuming a destination address lookup for a request returns at least one destination address, the request is routed to that destination address. If the given destination address replies with a specific special type of response (for example a SIP 503 Service Unavailable message), or does not reply at all for a given time period (for example a 32 second time-out period), the SIP server should try the next destination address provided by the destination address lookup. If the SIP server cannot find any responsive destination address after working its way through all the destination addresses provided by the destination address lookup service, a failure response is returned to the originating communication device.

In the case where there is no response from several destination addresses, it can take a long time (many multiples of 32 seconds) for the SIP server to work through those destinations addresses. The caller operating the originating communication device will typically have given up (and cancelled the call) before more than two destinations have been tried. The SIP server will stop DNS processing at that point. It soon becomes unacceptable for a service provider and their customers if this affects a lot of calls because callers will just hear silence for many seconds after attempting to conduct calls.

For this reason, it is known to "blacklist" any destination address found to be unresponsive, often for several minutes. A SIP element will ignore blacklisted destinations when performing DNS procedures. This means that fewer calls to problematic destinations are likely to suffer from long-term silence.

An example of such a problematic call is depicted in FIG. 1. Here the user of a requesting device 108 initiates a call via their requesting device 108. A call request is transmitted to SIP server 100 in step 1a. The call request includes an identifier for the desired destination, in this case the hostname 'metaswitch.com'. A DNS lookup is performed for this hostname in step 1b and destination addresses A, B and C are returned to SIP server 100 in step 1c. SIP server 100 transmits a request to destination address A in step 1d. No response is received from destination address A and the request times-out in step 1e. Destination address A is blacklisted and a further request is transmitted to destination address B in step 1f. While waiting for a response from destination address B, the call is cancelled by the user of requesting device 108 in step 1g. No response is received from destination address B and the request times-out in step 1h. Destination address B is blacklisted. The call has been cancelled, so destination address C is not attempted for that call.

The user of requesting device 108 (or a different requesting device, say requesting device 107) initiates another call via their requesting device 108 so a second call request is transmitted to SIP server 100 in step 1i. The second call request includes an identifier for the same desired destination, i.e. hostname 'metaswitch.com'. A DNS lookup is performed for the identifier in step 1j and destination addresses A, B and C are returned to SIP server 100 in step 1k. Destination address A and destination address B are blacklisted, so a request is transmitted to destination address C in step 1l. Destination address C responds in step 1m and the call succeeds. In the above example, although the first call attempt failed, subsequent call attempts to the same hostname now succeed quickly. If destination addresses A and B had not been blacklisted, the second call would have suffered the same fate as the first.

Blacklisting is beneficial for a further reason. In the context of hundreds of call attempts per second, to different destinations which might correspond to partially overlapping sets of destination addresses, a SIP server can reduce the time spent trying non-responsive destinations. An example of such a problematic call is depicted in FIG. 2. Here the user of a requesting device 108 initiates a call via their requesting device 108 and a call request is transmitted to SIP server 100 in step 2a. The call request includes an identifier for the desired destination, in this case the hostname 'metaswitch.com'. A DNS lookup is performed for this hostname in step 2b and destination addresses A and B are returned to SIP server 100 in step 2c. SIP server 100 transmits a request to destination address A in step 2d. No response is received from destination address A and the request times-out in step 2e. Destination address A is blacklisted and a further request is transmitted to destination address B in step 2f.

Meanwhile, the user of the same or a different requesting device 108 initiates a further call and a further call request is transmitted to SIP server 100 in step 2g. The call request includes an identifier for the desired destination, in this case to a different hostname 'dataconection.com'. A DNS lookup is performed for this hostname in step 2h and destination addresses A and C are returned to SIP server 100 in step 2i. Destination address A is blacklisted so a request is transmitted to destination address C in step 2k. Destination address C responds in step 2l and the call succeeds. In this example, a potentially failed call attempt was avoided by not attempting to route a request to destination address A, because SIP server 100 knew that destination address A was unresponsive, even though the further call was destined for a hostname different from the hostname of the initial call.

A problem arises if all of the destination addresses for a destination which the SIP server responsible for routing requests receives are blacklisted. Requests sent to such an affected destination would be rejected immediately until at least one entry in the blacklist had been timed-out; this could take some time. It would therefore be desirable to provide improved ways of processing requests in a telecommunications network, including where blacklisting of destination addresses is implemented.

SUMMARY

In accordance with embodiments, there is provided a method of processing requests in a telecommunications network, the method comprising:
maintaining a blacklist for determining routing attempts to be conducted during a default routing attempt procedure, the blacklist comprising a list of destination addresses which have been determined as being unavailable for routing requests to;
receiving a request comprising an identifier for a given destination for the request; in response to performing a destination address lookup for the identifier, receiving a set of one or more destination addresses for routing the request to;
comparing the one or more destination addresses in the set to the list of destinations on the blacklist;
if the comparison indicates that at least one of the one or more destination addresses in the set is not present on the blacklist, processing the request according to a default routing attempt procedure; and
if the comparison indicates that all of the one or more destination addresses in the set are present on the blacklist, processing the request according to an alternative routing attempt procedure.

Hence, rather than just sending a failure response if all destination address returned by a destination address lookup service are blacklisted, alternative action can be taken.

In embodiments, the alternative routing attempt procedure comprises attempting to route the request to at least one of the destination addresses in the set which are present on the blacklist. Hence, routing attempts to blacklisted destination addresses can be made in the hope that one of them has become available since they were blacklisted.

In some embodiments, the alternative routing attempt procedure comprises, in the case of determining that a destination address in the set has become available for routing requests to, deleting the destination address which has become available from the blacklist. Hence, the contents of a blacklist can be kept up-to-date according to current destination address availability.

In some embodiments, the default routing attempt procedure comprises attempting to route the request to at least one of the one or more destination addresses in the set which are not present on the blacklist.

Embodiments comprise, maintaining a primary blacklist for determining routing attempts to be conducted during the default routing attempt procedure, and maintaining one or more secondary blacklists for determining routing attempts to be conducted during the alternative routing attempt procedure. Hence, different types of blacklists can be employed depending on the results returned by the destination address lookup.

In some embodiments, the alternative routing attempt procedure comprises attempting to route the request to one or more of the destination addresses in the set, and in the case of a given destination address in the set being determined, during the attempting, as remaining unavailable for routing requests to, adding the given destination addresses to a secondary blacklist. Hence, a secondary blacklist provides a means for keeping a record of which destinations addresses are still unavailable.

In some embodiments, the alternative routing attempt procedure comprises, in the case of determining that a destination address in the set has become available for routing requests to, deleting the destination address which has become available from a secondary blacklist. Hence, the contents of a secondary blacklist can be kept up-to-date according to current destination address availability.

In some embodiments, the alternative routing attempt procedure comprises, in the case of determining that all of the destinations in the set remain unavailable for routing requests to, deleting all of the destination addresses in the set from a secondary blacklist. Hence, a secondary blacklist is correctly prepared for processing in relation to further requests.

In some embodiments, the alternative routing attempt procedure comprises, in the case of determining that all of the destinations in the set remain unavailable for routing requests to, transmitting a failure message in response to the request. Hence, the user attempting to initiate a call can be informed that the call is not possible.

Embodiments comprise receiving a further request comprising the identifier for the given destination for the further request, in response to performing a destination address lookup for the identifier, receiving the set of one or more destination addresses for routing the further request to, and processing the further request according to the alternative routing attempt procedure and, in the alternative routing attempt procedure, further attempting to route the further request to one or more destination addresses in the set with the exception of destination addresses on a secondary blacklist. Hence, a secondary blacklist can be shared across multiple requests.

Embodiments comprise maintaining a plurality of secondary blacklists for determining routing attempts to be conducted during the alternative routing attempt procedure, wherein each of the secondary blacklists in the plurality is employed during processing of requests which comprise identifiers for different respective destinations. Hence, secondary blacklists can be destination-specific.

In some embodiments, the method comprises deleting a secondary blacklist a predetermined time after creation of the respective secondary blacklist. Hence, secondary blacklists can be purged to prevent them becoming out-of-date.

In some embodiments, the set is presented as an ordered list and the alternative routing attempt procedure comprises attempting to route the request to each of the destination addresses in the set sequentially in the order in which they appear on the ordered list. Hence, the same priority order of destination addresses received from the destination address lookup can be employed to select which destination address to try before others in a secondary blacklist.

In some embodiments, the method comprises storing timing data indicative of when a previous attempt to route a request to a destination address was made, and the alternative routing attempt procedure comprises selecting a destination address in the set to attempt to route the request to on the basis of the stored timing data. Employing timing data to select which destination address to try before others can increase the chances of finding an available destination address more quickly.

In some embodiments, the identifier for the given destination comprises a hostname and the destination address lookup comprises a Domain Name Service (DNS) lookup for the hostname.

In some embodiments, the one or more destination addresses in the set comprise one or more of an Internet Protocol address, a port number, and a data transfer type.

In some embodiments, there is provided computer software adapted to perform the method of the above embodiments.

In some embodiments, there is provided apparatus comprising at least one processor, and at least one memory including computer program code, the at least one memory and the computer program code being adapted to, with the at least one processor, cause the apparatus at least to perform the method of the above embodiments. The apparatus may comprise a processing system adapted to perform the method of the above embodiments.

In some embodiments, there is provided a computer program product comprising a non-transitory computer-readable storage medium having computer readable instructions stored thereon, the computer readable instructions being executable by a computerised device to cause the computerised device to perform a method for processing requests in a telecommunications network, the method comprising:

maintaining a blacklist for determining routing attempts to be conducted during a default routing attempt procedure, the blacklist comprising a list of destination addresses which have been determined as being unavailable for routing requests to;

receiving a request comprising an identifier for a given destination for the request; in response to performing a destination address lookup for the identifier, receiving a set of one or more destination addresses for routing the request to;

comparing the one or more destination addresses in the set to the list of destinations on the blacklist;

if the comparison indicates that at least one of the one or more destination addresses in the set is not present on the blacklist, processing the request according to a default routing attempt procedure; and if the comparison indicates that all of the one or more destination addresses in the set are present on the blacklist, processing the request according to an alternative routing attempt procedure.

In some embodiments, there is provided a method of processing requests, the method comprising:

maintaining a blacklist comprising a list of destination addresses which have been determined as being unavailable for routing requests to;

receiving a request comprising an identifier for a given destination for the request; in response to performing a destination address lookup for the identifier, receiving one or more destination addresses for routing the request to, wherein the one or more destination addresses are on the blacklist; and routing the request to one of the one or more destination addresses despite the one of the one or more destination addresses being on the blacklist.

In some embodiments, there is a method of processing requests, the method comprising:

maintaining a blacklist comprising a list of destination addresses which are not available for routing requests to; and routing a request to a destination address on the blacklist.

Further features and advantages will become apparent from the following description of preferred embodiments, given by way of example only, which is made with reference to the accompanying drawings.

DETAILED DESCRIPTION

Figure 1:
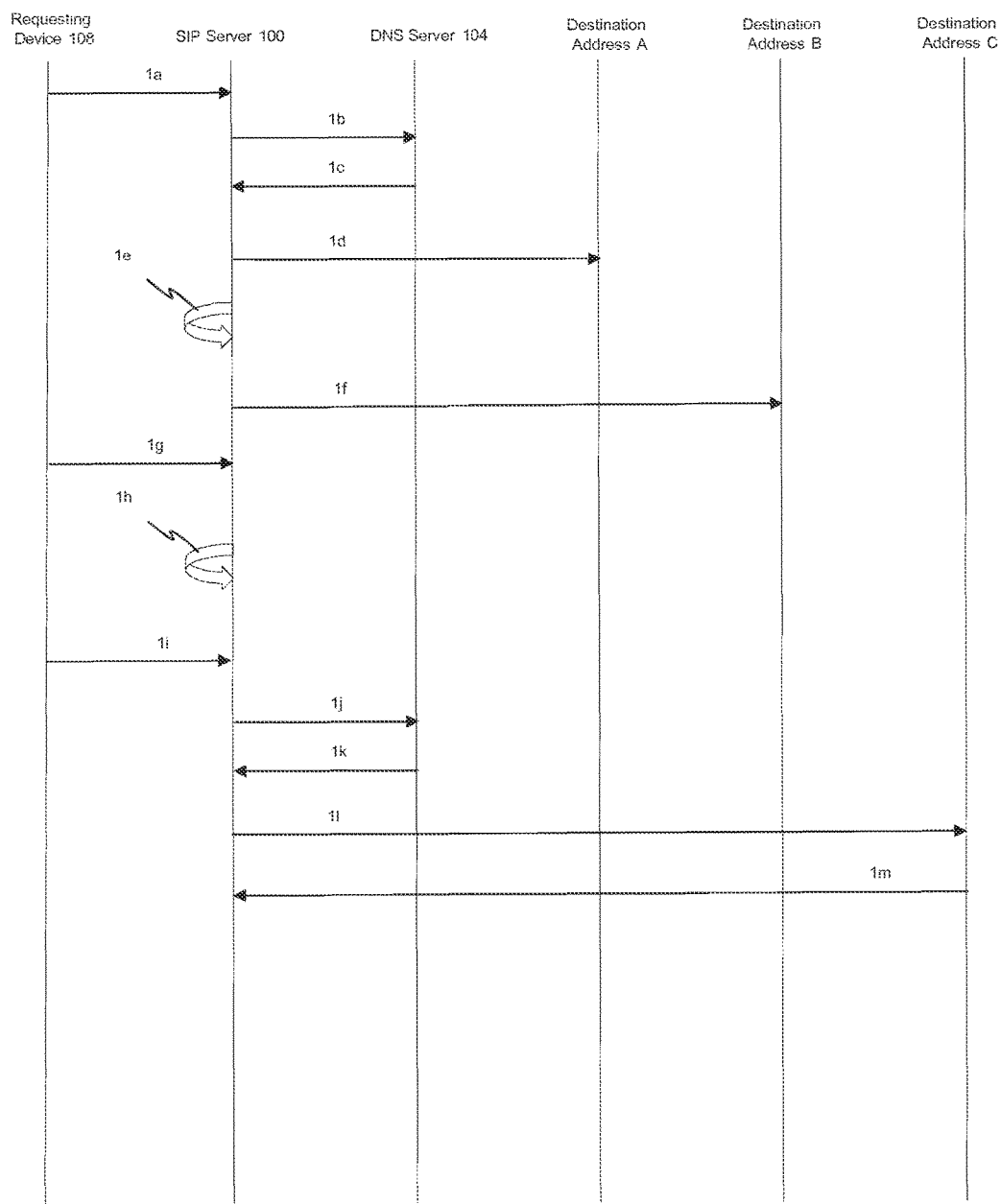
FIG. 1 shows a message flow diagram according to the prior art.
Figure 2:
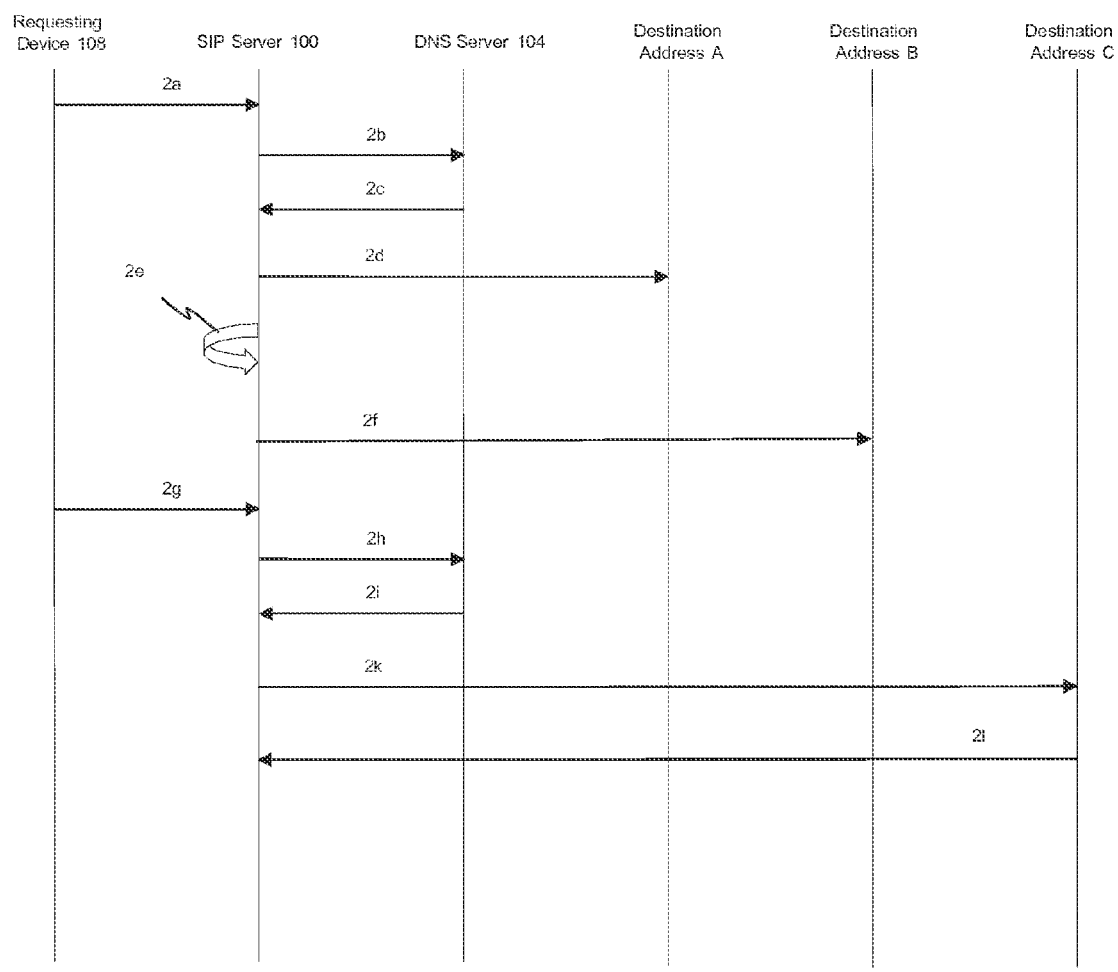
FIG. 2 shows a message flow diagram according to the prior art.
Figure 3:
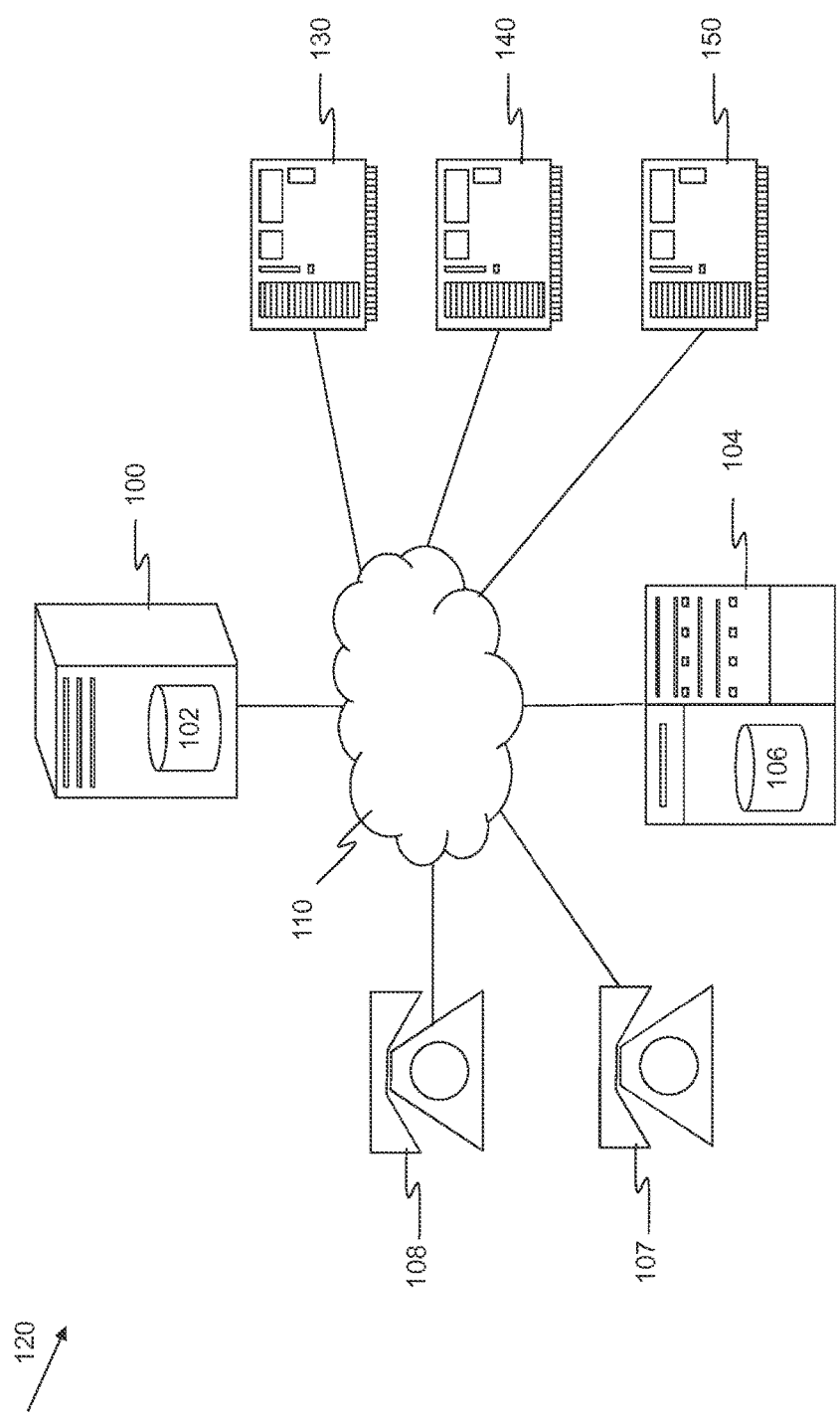
FIG. 3 shows a system diagram according to embodiments.

FIG. 3 shows a system diagram of a telecommunications network 120 according to embodiments.

Telecommunications network 120 comprises a user device 108 connected to a network 110. Network 110 may comprise one or more Public Switched Telephone Networks (PSTNs) and/or the Internet.

User device 108 may for example comprise a SIP telephony device which is able to process SIP signalling information in relation to communication sessions conducted with other devices in telecommunications network 120. Telecommunications network 120 may comprise more user devices (not shown).

Telecommunications network 120 comprises a communications services server 100 connected to network 110. Communications services server 100 is responsible for providing request processing services to user device 108 (and typically to other devices too which are not shown in FIG. 3). Communications services server 100 may also provide user device 108 with communication services, for example telephony services. Communications services server 100 may also be responsible for providing switching of communication sessions, for example telephone or video calls, for a number of devices (not shown) such as user device 108 including provision of dial tone, ringing tone, etc. Communications services server 100 may also be referred to as a telephone switch, local telephone exchange, central office, class 5 switch or softswitch. Communications services server 100 may also include the ability to select processes that can be applied to such sessions, routing for such sessions based on signalling and subscriber database information, the ability to transfer control of sessions to other network elements and management functions such as provisioning, fault detection and billing. Communications services server 100 may comprise a SIP server capable of processing SIP signalling information in relation to communication sessions conducted with other devices in telecommunications network 120, including processing of SIP signalling information in relation to provision of request processing services.

Communications services server 100 includes a database 102 for storing service logic and other data relating to blacklisting functionality which will be described in detail below. Database 102 may also be used for storing session related data such as session state and routing information.

Telecommunications network 110 also includes a destination address lookup server 104, for example a DNS server, connected to network 110. Destination address lookup server 104 is responsible for providing destination address lookup services to requesting devices, such as user device 108, in telecommunications network 120. Destination address lookup server 104 has a database 106 for storing lists of destination addresses for a number of destination devices 130, 140, 150. An entry for a destination device in database 106 includes an identifier for a destination device, for example 'metaswitch.com', and one or more destination addresses at which the destination device may be contacted in telecommunications network 120. In response to a query from a requesting device comprising an identifier for a given destination device, destination address lookup server 104 looks-up the appropriate database entry identified by the identifier and responds to the requesting device with one or more destination addresses for that device. If destination address lookup server 104 finds no database entry in database 106 corresponding to the identifier received in a destination address lookup request, then destination address lookup server 104 will return an appropriate error message to the requesting device.

In this example, telecommunications network 120 includes three destination devices 130, 140, 150 connected to network 110 although in reality there could be many more. Destination device 130 may have multiple destination addresses A, B, C at which they may be contacted in telecommunications network 120. Similarly, destination devices 140 and 150 may have multiple destination addresses at which they may be contacted in telecommunications network 120. A destination address may comprise an Internet Protocol (IP) address and possibly also a port number and data transport type, for example 1.2.3.4, 5060, TCP respectively (where TCP stands for Transmission Control Protocol).

Figure 4:
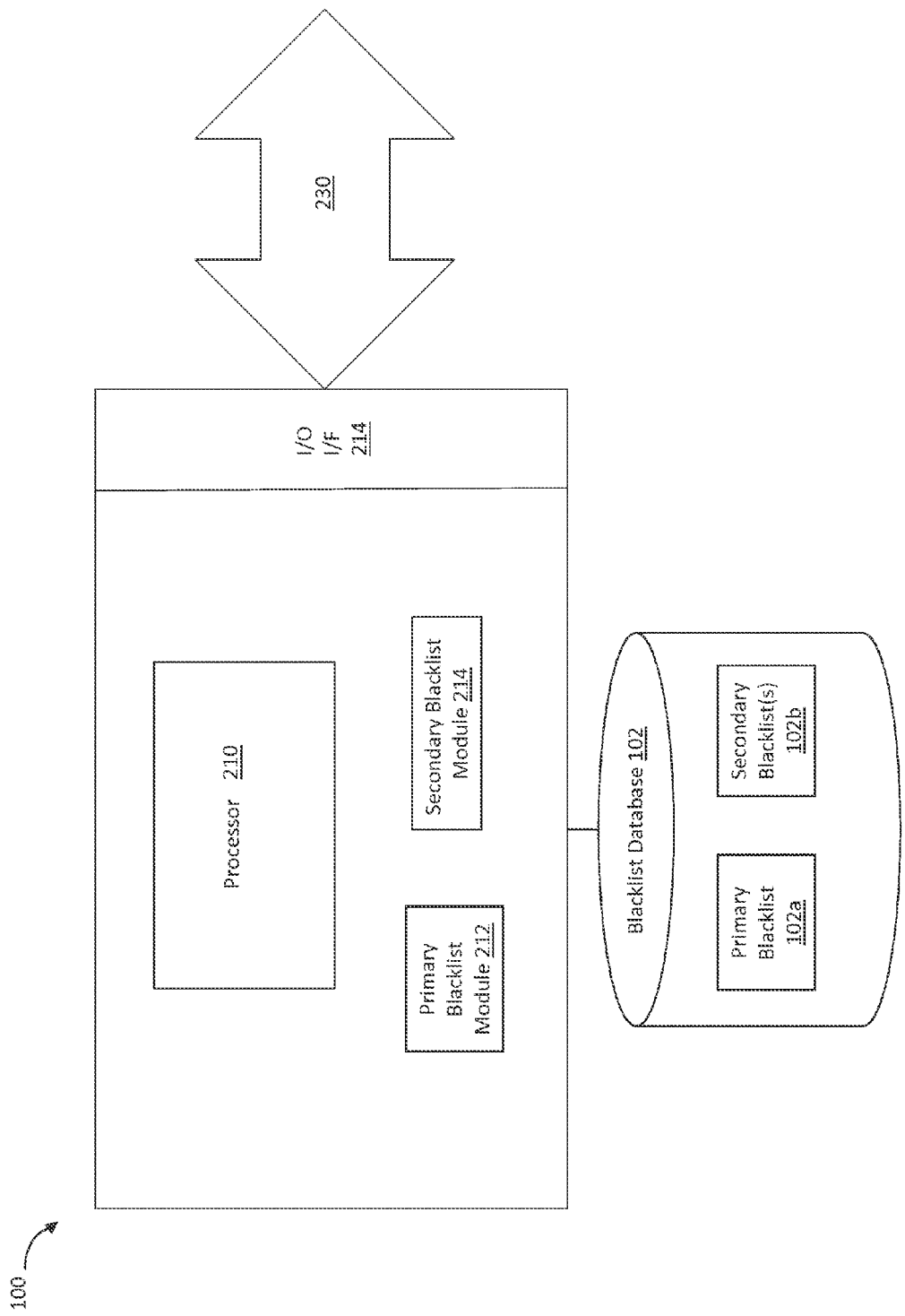
FIG. 4 shows a block diagram according to embodiments.

FIG. 4 shows a block diagram of communications services server 100 according to embodiments. Communications services server 100 comprises a processor 210 (or processors) for carrying out data processing functionality. Communications services server 100 comprises a primary blacklist module 212 for implementing primary blacklist functionality and a secondary blacklist module 214 for implementing secondary blacklist functionality. Communications services server 100 also includes a data store 102 for storing data relating to blacklist functionality including memory 102a for storing data related to primary blacklist functionality and memory 102b for storing data related to secondary blacklist functionality. Communications services server 100 comprises an input/output interface 214 for receiving and transmitting data 230 to/from network 110. Data 230 may for example comprise data relating to requests and data relating to destination address lookup services.

Figure 5:
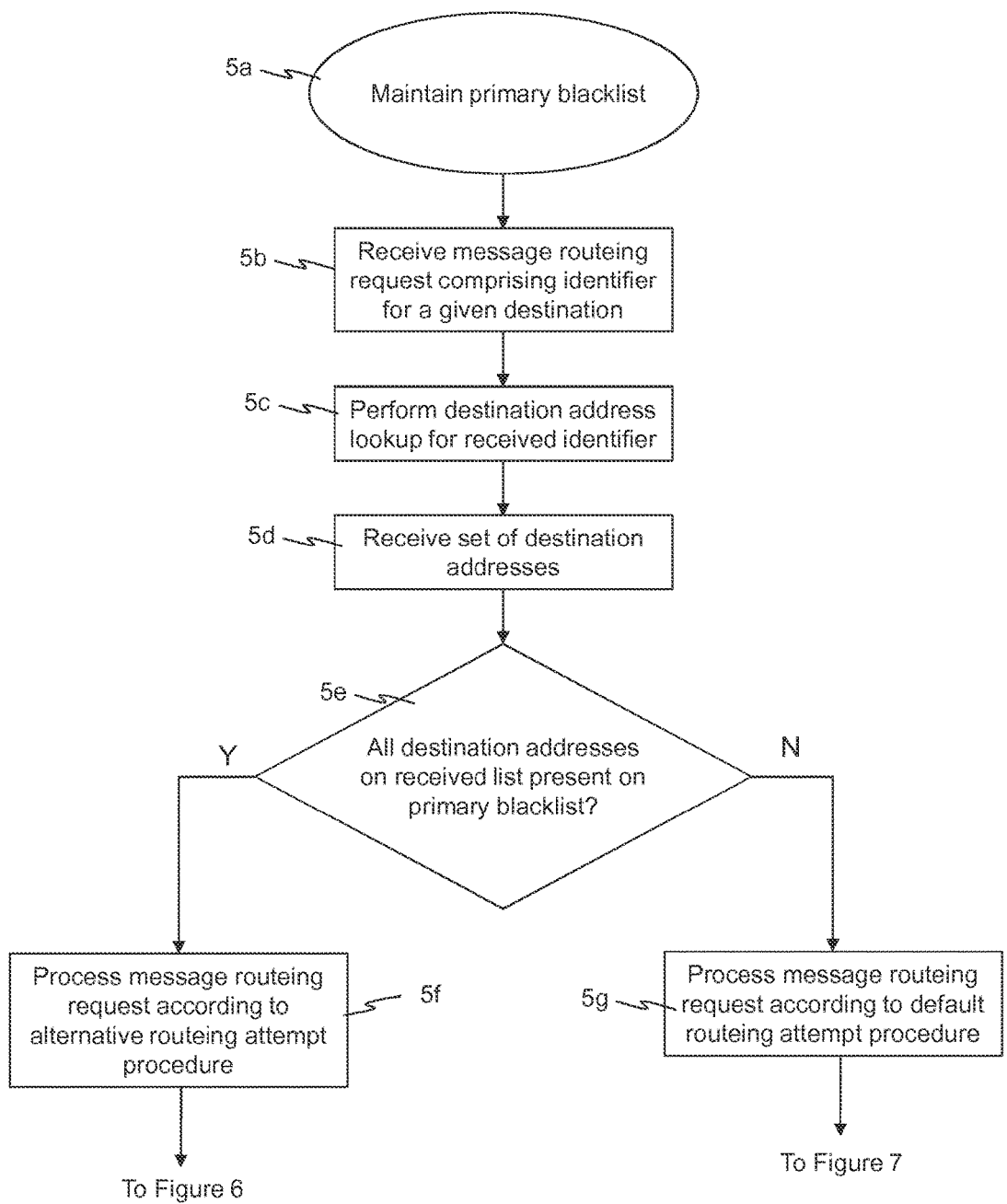
FIG. 5 shows a flow chart according to embodiments.

FIG. 5 shows a flow chart according to embodiments. FIG. 5 depicts embodiments for processing requests in telecommunications network 110. In these embodiments, user device 108 comprises a requesting device attempting to communicate with a desired destination (for example destination 130) identified by an identifier (for example 'metaswitch.com') in telecommunications network 110, communications services server 100 comprises a SIP server 100, and destination address lookup server 104 comprises a DNS server.

Step 5a involves SIP server 100 maintaining a blacklist for determining routing attempts to be conducted during a default routing attempt procedure. The blacklist comprises a list of destination addresses which have been determined as being unavailable for routing requests to.

The user of a requesting device 108 initiates a call via their requesting device 108 and a request is received at SIP server 100 in step 5b. The request includes an identifier for a given destination. The identifier may for example comprise a hostname for a desired destination such as 'metaswitch.com'.

A destination address lookup for the identifier is performed in step 5c by transmitting the identifier to DNS server 104. DNS server 104 accesses database 106, retrieves the appropriate data entry and transmits a set of one or more destination addresses for routing the request to SIP device 100. The set of one or more destination addresses is received at SIP server 100 in step 5d. In step 5e, SIP server 100 compares the one or more destination addresses in the received set to the list of destinations on the blacklist.

If the comparison indicates that at least one of the one or more destination addresses in the set is not present on the blacklist, then SIP server 100 processes the request according to a default routing attempt procedure as shown in step 5g. Details of the default routing attempt procedure are described below in relation to FIG. 7.

If the comparison indicates that all of the one or more destination addresses in the set are present on the blacklist, SIP server 100 processes the request according to an alternative routing attempt procedure as shown in step 5f. Details of the alternative routing attempt procedure are described below in relation to FIG. 6.

Figure 6:
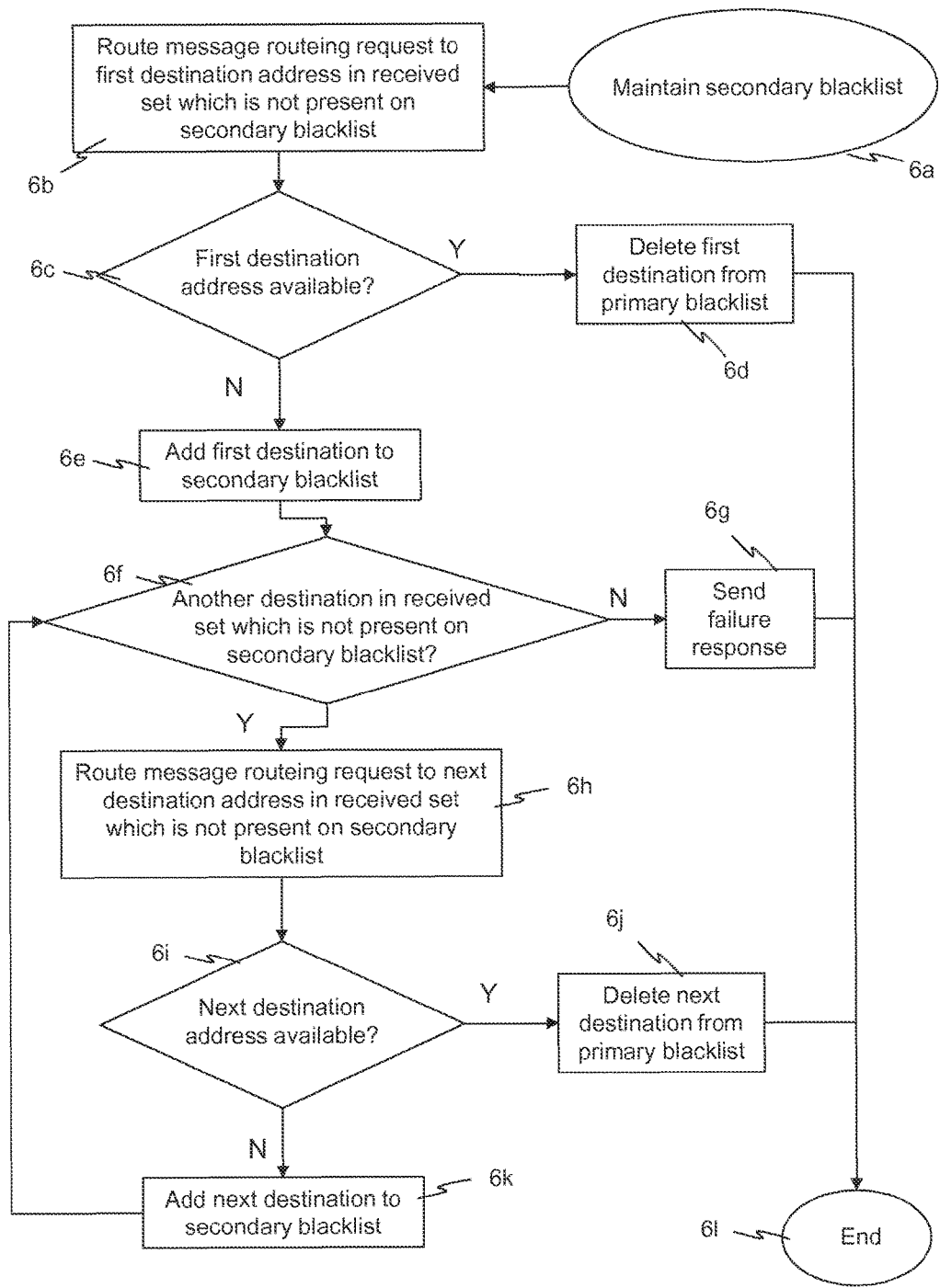
FIG. 6 shows a flow chart according to embodiments.

FIG. 6 shows a flow chart depicting an alternative routing attempt procedure according to embodiments. Step 6a of FIG. 6 continues after step 5f of FIG. 5 described above. These embodiments comprise maintaining a primary blacklist 102a for determining routing attempts to be conducted during a default routing attempt procedure and also maintaining one or more secondary blacklists 102b for determining routing attempts to be conducted during an alternative routing attempt procedure (as per step 6a).

In such embodiments, due to maintenance and operation of a primary blacklist, a request is destined for a destination for which all the destination addresses are currently on a primary blacklist. According to embodiments, SIP server 100 does not just give up and send a failure response in response to a new request. Instead, SIP server 100 attempts to transmit message routing requests to destination addresses previously found to be unresponsive, in case one has now become responsive again; this is enabled by introduction of the concept of a secondary blacklist as explained below in detail.

SIP server 100 attempts to route the request to at least one of the destination addresses in the set of one or more destination received from DNS server 104 which are present on primary blacklist 102a but not present on secondary blacklist 102b. In step 6b, SIP server 100 routes the request to the first destination address in the received set of destinations which is not present on secondary blacklist 102b. In step 6c, SIP server 100 determines whether the first destination address in the set which is not present on secondary blacklist 102b has become available for routing requests to.

If the first destination address which is not present on secondary blacklist 102b has become available, then SIP server 100 deletes the first destination address from primary blacklist 102a in step 6d and processing of the request ends in step 6l.

If the first destination address in the set which is not present on secondary blacklist 102*b* is determined as remaining unavailable for routing requests to, then SIP server 100 adds the first destination address to secondary blacklist 102*b* in step 6*e*.

In step 6*f*, SIP server 100 determines whether there is another destination address in the received set of destinations which is not present on secondary blacklist 102*b*.

If SIP server 100 fails to identify such another destination address, then SIP server 100 concludes that there are no more destination addresses in the received set of destination addresses which are not present on secondary blacklist 102*b* to attempt to route the request to. SIP server 100 transmits a failure response message to requesting device 108 in step 6*g* and processing of the request ends in step 6*l*.

If SIP server 100 does identify another destination address in the received set of destinations which is not present on secondary blacklist 102*b*, then SIP server 100 routes the request to the next destination address in the received set of destinations which is not present on secondary blacklist 102*b* in step 6*h*.

In step 6*i*, SIP server 100 determines whether the next destination address in the set which is not present on secondary blacklist 102*b* has become available for routing requests to.

If the next destination address which is not present on secondary blacklist 102*b* has become available, then SIP server 100 deletes this next destination address from primary blacklist 102*a* in step 6*j* and processing of the request ends in step 6*l*.

If the next destination address in the set which is not present on secondary blacklist 102*b* is determined as remaining unavailable for routing requests to, then SIP server 100 adds the first destination address to secondary blacklist 102*b* in step 6*k*.

Processing of the request according to the alternative routing procedure continues according to step 6*f* where SIP server 100 determines whether there are any further destination addresses in the received set of destinations which are not present on secondary blacklist 102*b*.

If SIP server 100 determines there are no further destination addresses in the received set of destinations which are not present on secondary blacklist 102*b*, i.e. all of the destinations in the set remain unavailable for routing requests to, then SIP server 100 transmits a failure response message to requesting device 108 in step 6*g*. Processing of the request ends in step 6*l*.

In embodiments, the user of a requesting device (either requesting device 108 or a different requesting device) initiates a call via their requesting device and a further request is received at SIP server 100. The further request includes the same identifier for the same desired destination as described above in relation to FIGS. 5 and 6. A destination address lookup for the identifier is performed and DNS server 104 returns the same set of one or more destination addresses for routing the further request to. The further request is processed by SIP server 100 according to the alternative routing attempt procedure and, in the alternative routing attempt procedure SIP server 100 attempts to route the further request to one or more destination addresses in the set with the exception of destination addresses already on the secondary blacklist. The same secondary blacklist may thus be used for multiple requests. When processing a subsequent request, destination addresses which have already been added to the secondary blacklist during processing of a previous request can be skipped because the previous processing has already determined that they are unavailable.

In embodiments, the alternative routing attempt procedure comprises, in the case of determining that all of the destinations in the set of one or more destinations remain unavailable for routing requests to, all of the destination addresses in the set are deleted from the secondary blacklist. If this purging of the secondary blacklist was not carried out, then, when a further message processing request was processed according to the alternative routing attempt procedure, the destination addresses on the secondary list would all be skipped without any attempt to route requests to them being made. This purging of the secondary blacklist therefore ensures that the secondary blacklist is ready for correct processing in relation to subsequent requests. Note that the determination that all of the destinations in the set of one or more destinations remain unavailable may be made during processing of a single request or may be determined over the course of processing multiple requests. A failure message may be transmitted to the requesting device in response to determining that all of the destinations in the set remain unavailable for routing requests to.

In embodiments, SIP server 100 maintains a plurality of secondary blacklists for determining routing attempts to be conducted during the alternative routing attempt procedure. Each of the secondary blacklists in the plurality is employed during processing of requests which comprise identifiers for different respective destinations. Such embodiments employ secondary blacklists which are specific to certain destinations, for example one secondary blacklist may be used for requests identifying the 'metaswitch.com' hostname and another secondary blacklist may be used for requests identifying the 'dataconnection.com' hostname.

In embodiments, SIP server 100 will delete secondary blacklists a predetermined time after their creation. This may involve setting a timer when a secondary blacklist is created or when one or more destination addresses are added to the secondary blacklist. When the timer reaches a certain value, the contents of the secondary blacklist are deleted to prevent them becoming out-of-date.

In some embodiments, the set of one or more destinations received by the communications services server 100 is presented as an ordered list and the alternative routing attempt procedure comprises attempting to route the request to each of the destination addresses in the set sequentially in the order in which they appear on the ordered list.

In alternative embodiments, timing data indicative of when a previous attempt to route a request to a destination address was made is stored, for example in database 102. In such alternative embodiments, the alternative routing attempt procedure comprises selecting a destination address in the set to attempt to route the request to on the basis of the stored timing data. The chances of finding an available destination address at an earlier stage can be increased by employing timing data to assist in the selection of which destination address to attempt to route a request to first. A destination address from the set of destination addresses received from the destination address lookup server 104 which has a longer associated time since the last attempt to route a request to it is more likely to have become available than a destination address from the received list which has a shorter associated time since the last attempt to route a request to it; preferentially selecting a destination address with timing data associated with the former as opposed to the latter will therefore tend to lead to the discovery of an available destination address more quickly.

Figure 7:
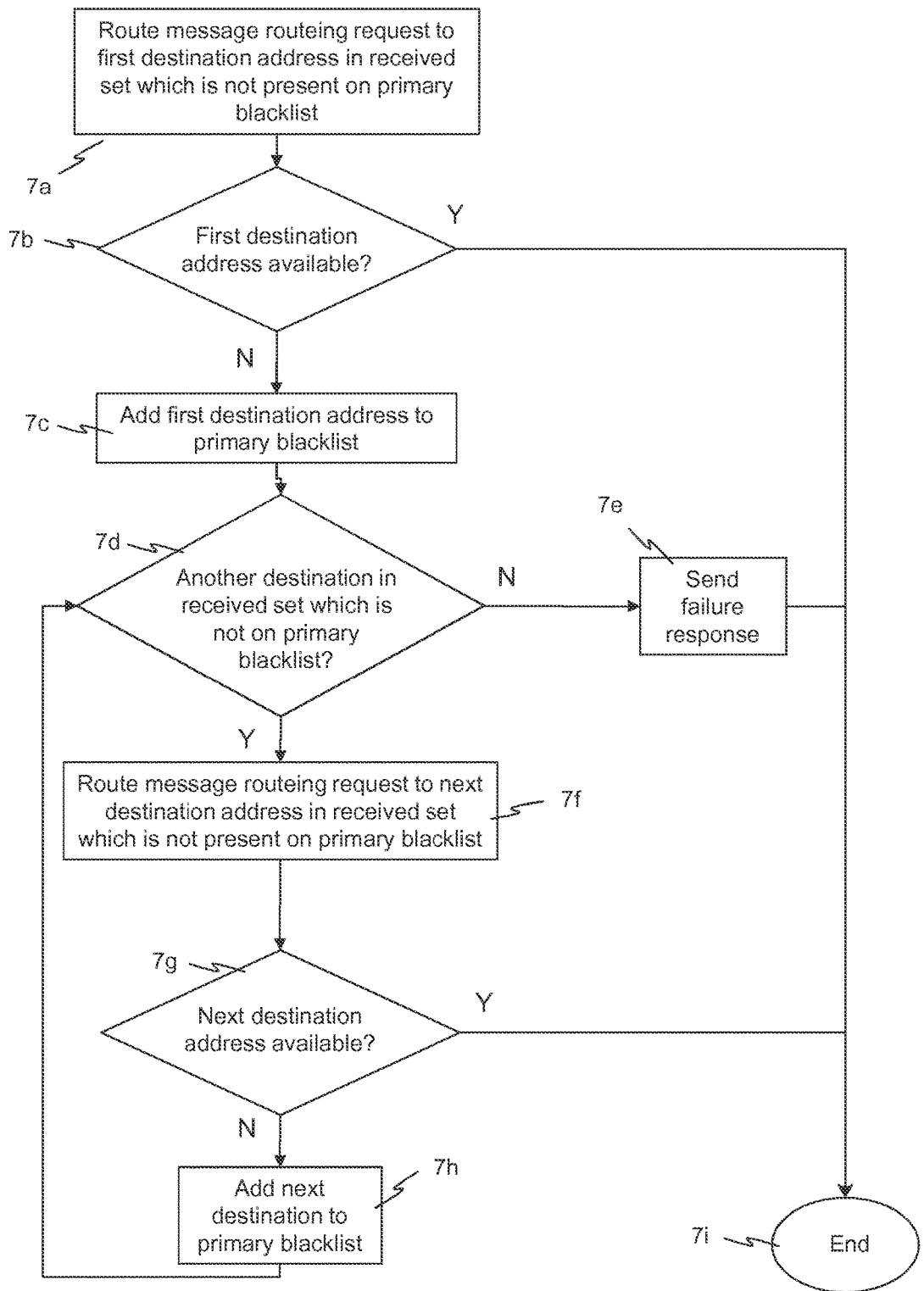
FIG. 7 shows a flow chart according to embodiments.

FIG. 7 shows a flow chart depicting a default routing attempt procedure according to embodiments. Step 7a of FIG. 7 continues after step 5g of FIG. 5 described above. These embodiments involve SIP server 100 attempting to route a request received from requesting device 108 to at least one of the destination addresses in a set of one or more destination addresses received from DNS server 104 which are not present on primary blacklist 102a.

In step 7a, SIP server 100 routes the request to the first destination address in the received set of destinations which is not present on primary blacklist 102a. In step 7b, SIP server 100 determines whether the first destination address in the set which is not present on primary blacklist 102a has become available for routing requests to.

If the first destination address which is not present on primary blacklist 102a has become available, then processing of the request ends in step 7i.

If the first destination address in the set which is not present on primary blacklist 102a is determined as being unavailable for routing requests to, then SIP server 100 adds the first destination address to the primary blacklist.

SIP server 100 then determines in step 7d whether there is another destination address in the received set of destinations which is not present on primary blacklist 102a.

If SIP server 100 fails to identify such another destination address, then SIP server 100 concludes that there are no more destination addresses in the received set of destination addresses which are not present on primary blacklist 102a to attempt to route the request to. SIP server 100 transmits a failure response message to requesting device 108 in step 7e and processing of the request ends in step 7i.

If SIP server 100 does identify another destination address in the received set of destinations which is not present on primary blacklist 102a, then SIP server 100 routes the request to the next destination address in the received set of destinations which is not present on primary blacklist 102a in step 7f.

In step 7g, SIP server 100 determines whether the next destination address in the received set of destinations which is not present on primary blacklist 102a has become available for routing requests to.

If the next destination address which is not present on primary blacklist 102a has become available, then processing of the request ends in step 7i.

If the next destination address in the set which is not present on primary blacklist 102a is determined as being unavailable for routing requests to, then SIP server 100 adds this next destination address to primary blacklist 102a in step 7h and processing returns to step 7d.

Processing of the request according to the default routing procedure continues according to step 7d where SIP server 100 determines whether there are any further destination addresses in the received set of destinations which are not present on primary blacklist 102a until all further destinations in the received set have been processed.

Figure 8:
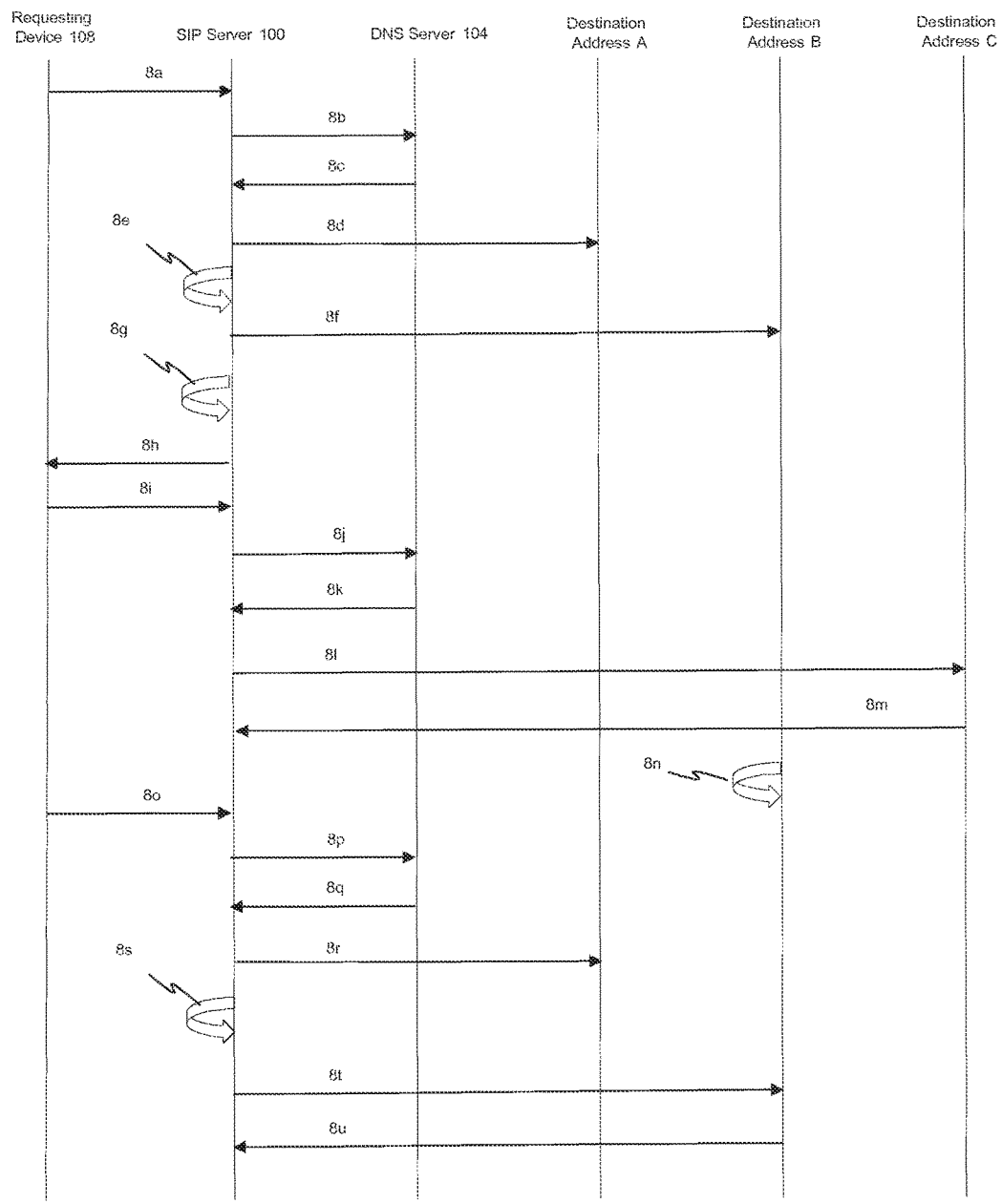
FIG. 8 shows a message flow diagram according to embodiments.

FIG. 8 shows a message flow diagram according to embodiments. In these embodiments, a primary blacklist is maintained and employed in processing requests according to the default routing attempt procedure. Further, a secondary blacklist is maintained and employed in processing a request according to the alternative routing attempt procedure. Initially, both the primary and secondary blacklists do not contain any destination addresses.

The user of a requesting device 108 initiates a call via their requesting device 108. A request is transmitted to SIP server 100 in step 8a. The request includes an identifier for the desired destination, in this case the hostname 'metaswitch.com'. SIP server 100 performs a DNS lookup by contacting DNS server 104 for this hostname in step 8b and a set of one or more destination addresses (in this case destination address A and destination address B) are returned and received by SIP server 100 in step 8c. SIP server 100 compares the one or more destination addresses in the received set to the list of destinations on the primary blacklist and determines that neither destination address A nor destination address B are on the primary blacklist. SIP server 100 therefore processes the request according to the default routing attempt procedure.

SIP server 100 routes the request to the first destination address in the received set of destinations, in this case destination A in step 8d. No response is received from destination address A and the request times-out in step 8e. SIP server 100 thus determines that destination address A is unavailable for routing requests to and adds destination address A to the primary blacklist.

SIP server 100 then determines that there is another destination address in the received set of destination addresses which is not present on the primary blacklist, in this case destination address B.

SIP server 100 transmits a request to destination address B in step 8f. No response is received from destination address B and the request times-out in step 8g. SIP server 100 adds destination address B to the primary blacklist. SIP server 100 thus determines that destination address B is unavailable for routing requests to.

SIP server 100 determines that there are no more destination addresses in the received set of destination addresses which are not present on the primary blacklist to attempt to route the request to. SIP server 100 transmits a failure response message to requesting device 108 in step 8h.

The user of requesting device 108 initiates another call via their requesting device 108. A second request is transmitted to SIP server 100 in step 8i. The request includes an identifier for the desired destination, in this case hostname 'dataconnection.com'. A DNS lookup is performed for the identifier in step 8j and destination addresses B and C are returned to SIP server 100 in step 8k. Destination address B is on the primary blacklist, so a request is transmitted to destination address C in step 8l. A response is received from destination address C in step 8m and the call succeeds.

The device locatable at destination address B is rebooted in step 8n and thus becomes available for routing request to; note that SIP server 100 is not aware of such at this stage.

The user of requesting device 108 initiates another call via their requesting device 108. A third request is transmitted to SIP server 100 in step 8o. The third request includes an identifier for the same desired destination as in step 8a, i.e. hostname 'metaswitch.com'. A DNS lookup is performed for the identifier in step 8p and destination addresses A and B are returned to SIP server 100 in step 8q.

SIP server 100 compares the one or more destination addresses in the received set to the list of destinations on the primary blacklist. The comparison indicates that all of the one or more destination addresses in the received set, i.e. both destination address A and destination address B, are present on the primary blacklist. SIP server 100 therefore processes the third request according to the alternative routing attempt procedure and attempts to route the request to at least one of the destination addresses in the set which are present on the primary blacklist but not present on the secondary blacklist.

Destination address A is the first destination address in the set of destination addresses received during the destination address lookup. Further, destination A is not on the secondary blacklist, so SIP server 100 routes the third request to destination address A in step 8r. No response is received from destination address A and the request times-out in step 8s. SIP server 100 thus determines that destination address A remains unavailable for routing requests to and adds destination address A to the secondary blacklist.

SIP server 100 determines that there is another destination address in the received set of destinations which is present on the primary blacklist but not present on the secondary blacklist, in this case destination address B. SIP server 100 therefore routes the third request to destination address B in step 8t.

Since the device locatable at destination address B was rebooted in step 8n, a response is received from destination address B in step 8u and the call succeeds. Here, despite running out of destination addresses to attempt to route requests to when processing a primary blacklist, processing of a secondary blacklist is employed to efficiently discover an available destination address and allow a call to succeed.

In embodiments, communications services server 100 can determine that a destination address is unavailable for routing requests in a number of different ways. One way to determine that a destination address is unavailable for routing requests to comprises receiving a failure response from the destination address in response to the respective request. Another way to determine that a destination address is unavailable for routing requests to comprises receiving no response from the destination address for a given time period after routing of the respective request.

Embodiments comprise a method of processing requests, the method comprising:
  maintaining a blacklist comprising a list of destination addresses which have been determined as being unavailable for routing requests to;
  receiving a request comprising an identifier for a given destination for the request; in response to performing a destination address lookup for the identifier, receiving one or more destination addresses for routing the request to, wherein the one or more destination addresses are on the blacklist; and
  routing the request to one of the one or more destination addresses despite the one of the one or more destination addresses being on the blacklist.

Embodiments comprise a method of processing requests, the method comprising:
  maintaining a blacklist comprising a list of destination addresses which are not available for routing requests to; and
  routing a request to a destination address on the blacklist.

The above embodiments are to be understood as illustrative examples. Further embodiments are envisaged.

Embodiments are described above in relation to communication between various devices carried out using SIP. Embodiments also apply where communication is carried using other protocols, for example Signalling System #7 (SS7) or International Telecommunication Union Telecommunication Standardisation Sector (ITU-T) recommendation H.323.

In embodiments described above, destination address lookups are performed using an identifier in the form of a hostname. The these and other embodiment, the hostname could form only a part of the information that is used for a destination address lookup.

In embodiments, entries of a primary blacklist are deleted a certain time after they are added to the primary blacklist. Such 'timing-out' or 'purging' of blacklist entries is carried out to prevent them becoming out-of-date. Similar purging measures can be taken on order to delete entries on secondary blacklists. Purging may be carried out on a per blacklist basis, rather than a per blacklist entry basis.

In some embodiments, the rate at which entries on a primary blacklist are purged may be dependent upon the rate at which entries on one or more secondary blacklists are purged. For example the rate at which entries on a primary blacklist are deleted may be greater than the rate at which entries on a secondary blacklist are deleted, or the rate at which entries on a secondary blacklist are deleted may be greater than the rate at which entries on a primary blacklist are deleted.

In some embodiments, the rates at which entries on primary and secondary blacklists are purged are independent of each other.

The purging rates for primary and secondary blacklists may vary depending on various factors, for example current network conditions, DNS configuration, size of blacklist, etc.

In alternative embodiments, when SIP server 100 receives a set of destination addresses from destination address lookup server 104 for routing a request to, communications services server 100 compares the destination addresses in the set to the list of destinations on a blacklist. If all the destination addresses in the received set are on the blacklist, then communications services server 100 removes each of the destination addresses in the set from the blacklist. A request can then be transmitted to each destination in the set in turn to see if a response is received. Such embodiments provide an alternative mechanism to prior art systems where, upon discovering that all destinations are blacklisted, a failure response is transmitted to the requesting device straight away. Such embodiments only require maintenance and operation of a single blacklist rather than both a primary and a secondary blacklist.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:
1. A method of processing requests in a telecommunications network, the method comprising:
  maintaining a blacklist for determining routing attempts to be conducted during a default routing attempt procedure, the blacklist comprising a list of destination addresses which have been determined as being currently unavailable for routing requests to;
  receiving a request comprising an identifier for a given destination for the request;
  in response to performing a destination address lookup for the identifier, receiving a set of one or more destination addresses for routing the request to;
  comparing the one or more destination addresses in the set to the list of determined currently unavailable destination addresses on the blacklist;
  if the comparison indicates that at least one of the one or more destination addresses in the set is not present on the blacklist, processing the request according to a default routing attempt procedure; and
  if the comparison indicates that all of the one or more destination addresses in the set are present on the blacklist, processing the request according to an alternative routing attempt procedure,
wherein the alternative routing attempt procedure comprises attempting to route the request to at least one of the determined currently unavailable destination addresses on the blacklist which are also in the set, and in the case of determining that a destination address in the set has become available for routing requests to, deleting the destination address which has become available from the blacklist.

2. The method according to claim 1, wherein the default routing attempt procedure comprises attempting to route the request to at least one of the one or more destination addresses in the set which are not present on the blacklist.

3. The method according to claim 1, further comprising:
maintaining a primary blacklist for determining routing attempts to be conducted during the default routing attempt procedure; and
maintaining one or more secondary blacklists for determining routing attempts to be conducted during the alternative routing attempt procedure.

4. The method according to claim 3, wherein the alternative routing attempt procedure comprises:
attempting to route the request to one or more of the destination addresses in the set; and
in the case of a given destination address in the set being determined, during the attempting, as remaining unavailable for routing requests to, adding the given destination addresses to a secondary blacklist.

5. The method according to claim 3, wherein the alternative routing attempt procedure comprises, in the case of determining that a destination address in the set has become available for routing requests to, deleting the destination address which has become available from a secondary blacklist.

6. The method according to claim 3, wherein the alternative routing attempt procedure comprises, in the case of determining that all of the destinations in the set remain unavailable for routing requests to, deleting all of the destination addresses in the set from a secondary blacklist.

7. The method according to claim 3, wherein the alternative routing attempt procedure comprises, in the case of determining that all of the destinations in the set remain unavailable for routing requests to, transmitting a failure message in response to the request.

8. The method according to claim 3, further comprising:
receiving a further request comprising the identifier for the given destination for the further request;
in response to performing a destination address lookup for the identifier, receiving the set of one or more destination addresses for routing the further request to; and
processing the further request according to the alternative routing attempt procedure and, in the alternative routing attempt procedure, further attempting to route the further request to one or more destination addresses in the set with the exception of destination addresses on a secondary blacklist.

9. The method according to claim 3, further comprising:
maintaining a plurality of secondary blacklists for determining routing attempts to be conducted during the alternative routing attempt procedure,
wherein each of the secondary blacklists in the plurality is employed during processing of requests which comprise identifiers for different respective destinations.

10. The method according to claim 3, further comprising deleting a secondary blacklist a predetermined time after creation of the respective secondary blacklist.

11. The method according to claim 1, wherein the set is presented as an ordered list and the alternative routing attempt procedure comprises attempting to route the request to each of the destination addresses in the set sequentially in the order in which they appear on the ordered list.

12. The method according to claim 1, further comprising:
storing timing data indicative of when a previous attempt to route a request to a destination address was made,
wherein the alternative routing attempt procedure comprises selecting a destination address in the set to attempt to route the request to on the basis of the stored timing data.

13. The method according to claim 1, wherein the identifier for the given destination comprises a hostname and the destination address lookup comprises a Domain Name Service (DNS) lookup for the hostname.

14. The method according to claim 1, wherein the one or more destination addresses in the set comprise one or more of:
an Internet Protocol address,
a port number, and
a data transport type.

15. A method of processing requests, comprising:
maintaining a blacklist comprising a list of destination addresses which have been determined as being currently unavailable for routing requests to;
receiving a request comprising an identifier for a given destination for the request;
in response to performing a destination address lookup for the identifier, receiving one or more destination addresses for routing the request to, wherein the one or more destination addresses are on the blacklist; and
routing the request to one of the one or more destination addresses despite the one of the one or more destination addresses being on the blacklist; and
in the case of determining that a destination address in the set has become available for routing requests to, deleting the destination address which has become available from the blacklist.

16. An apparatus, comprising:
at least one processor;
and at least one memory including computer program code
the at least one memory and the computer program code being configured to, with the at least one processor, cause the processor to:
maintain a blacklist for determining routing attempts to be conducted during a default routing attempt procedure, the blacklist comprising a list of destination addresses which have been determined as being currently unavailable for routing requests to;
receive a request comprising an identifier for a given destination for the request;
in response to performing a destination address lookup for the identifier, receiving a set of one or more destination addresses for routing the request to;
compare the one or more destination addresses in the set to the list of determined currently unavailable destination addresses on the blacklist;
if the comparison indicates that at least one of the one or more destination addresses in the set is not present on the blacklist, process the request according to a default routing attempt procedure; and
if the comparison indicates that all of the one or more destination addresses in the set are present on the blacklist, process the request according to an alternative routing attempt procedure, wherein the alternative routing attempt procedure comprises attempting to route the request to at least one of the determined currently unavailable destination addresses on the blacklist which are also in the set, and in the case of determining that a destination address in the set has become available for routing requests to, deleting the destination address which has become available from the blacklist.

17. A non-transitory computer-readable storage medium comprising a set of computer-executable instructions stored thereon, which, when executed by a processor, cause a computerized device to perform a method for processing requests in a telecommunications network, the method comprising:

maintaining a blacklist for determining routing attempts to be conducted during a default routing attempt procedure, the blacklist comprising a list of destination addresses which have been determined as being currently unavailable for routing requests to;

receiving a request comprising an identifier for a given destination for the request;

in response to performing a destination address lookup for the identifier, receiving a set of one or more destination addresses for routing the request to;

comparing the one or more destination addresses in the set to the list of determined currently unavailable destination addresses on the blacklist;

if the comparison indicates that at least one of the one or more destination addresses in the set is not present on the blacklist, processing the request according to a default routing attempt procedure; and if the comparison indicates that all of the one or more destination addresses in the set are present on the blacklist, processing the request according to an alternative routing attempt procedure, wherein the alternative routing attempt procedure comprises attempting to route the request to at least one of the determined currently unavailable destination addresses on the blacklist which are also in the set, and in the case of determining that a destination address in the set has become available for routing requests to, deleting the destination address which has become available from the blacklist.

\* \* \* \* \*